US011996226B2

(12) United States Patent
Hirukawa

(10) Patent No.: US 11,996,226 B2
(45) Date of Patent: May 28, 2024

(54) MULTILAYER COIL COMPONENT

(71) Applicant: Murata Manufacturing Co., Ltd., Kyoto-fu (JP)

(72) Inventor: Atsuo Hirukawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 606 days.

(21) Appl. No.: 17/230,279

(22) Filed: Apr. 14, 2021

(65) Prior Publication Data

US 2021/0327636 A1 Oct. 21, 2021

(30) Foreign Application Priority Data

Apr. 21, 2020 (JP) ................................ 2020-075532

(51) Int. Cl.
*H01F 27/28* (2006.01)
*H01F 27/29* (2006.01)
*H01F 41/04* (2006.01)

(52) U.S. Cl.
CPC ......... *H01F 27/2804* (2013.01); *H01F 27/29* (2013.01); *H01F 41/041* (2013.01); *H01F 2027/2809* (2013.01)

(58) Field of Classification Search
CPC .... H01F 27/2804; H01F 27/29; H01F 41/041; H01F 2027/2809; H01F 27/292; H01F 41/043; H01F 41/046; H01F 17/0013; H01F 27/34
USPC ......................................... 336/192, 200, 198
See application file for complete search history.

(56) References Cited

U.S. PATENT DOCUMENTS 9,412,509 B2 * 8/2016 Im ......................... H01F 27/292
2005/0013083 A1 * 1/2005 Takazawa ........... H01F 17/0013 361/118
2019/0304667 A1 * 10/2019 Hirukawa ............. H01F 27/292
2020/0083587 A1 * 3/2020 Matsushita ............. H01P 5/184

FOREIGN PATENT DOCUMENTS

| | | | |
|---|---|---|---|
| CN | 110349733 | A | 10/2019 |
| CN | 110349734 | A | 10/2019 |
| JP | H04-206607 | A | 7/1992 |
| JP | 2002-093623 | A | 3/2002 |
| JP | 2005-294725 | A | 10/2005 |
| JP | 2007-063060 | A | 3/2007 |
| JP | 2019-186254 | A | 10/2019 |

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

A multilayer coil component includes a multilayer body including insulating layers and having a first end face and a second end face, a first main surface and a second main surface, and a first side surface and a second side surface; a coil provided inside the multilayer body; a first outer electrode spreading from part of the first end face over part of the first main surface; and a second outer electrode spreading from part of the second end face over part of the first main surface. The laminating direction of the insulating layers and a direction of a coil axis of the coil are parallel to the first main surface as a mount surface. The coil has a length in a length direction from 85% to 94% of the length of the multilayer body in the length direction.

12 Claims, 8 Drawing Sheets

MULTILAYER COIL COMPONENT

CROSS-REFERENCE TO RELATED APPLICATION

This application claims benefit of priority to Japanese Patent Application No. 2020-075532, filed Apr. 21, 2020, the entire content of which is incorporated herein by reference.

BACKGROUND

Technical Field

The present disclosure relates to a multilayer coil component.

Background Art

An example of a multilayer coil component disclosed in Japanese Unexamined Patent Application Publication No. 2019-186254 includes a multilayer body with a plurality of laminated insulating layers and having a coil incorporated therein, and a first outer electrode and a second outer electrode that are electrically connected to the coil, the coil having a length equal to or more than 85.0% of the length of the multilayer body and equal to or less than 94.0% thereof (i.e., from 85.0% of the length of the multilayer body to 94.0% thereof).

SUMMARY

In the multilayer coil component, the direct current resistance (Rdc) is desired to be decreased to increase the rated current. In this regard, while the multilayer coil component described in Japanese Unexamined Patent Application Publication No. 2019-186254 is thought to be excellent in high frequency characteristics in a high frequency band (for example, a GHz band equal to or more than 20 GHz), there is scope for improvement in decreasing the direct current resistance.

Accordingly, the present disclosure provides a multilayer coil component that is excellent in high frequency characteristics and has a low direct current resistance.

According to preferred embodiments of the present disclosure, a multilayer coil component includes: a multilayer body formed with a plurality of insulating layers laminated in a laminating direction; a coil provided inside the multilayer body; and a first outer electrode and a second outer electrode provided on a surface of the multilayer body and electrically connected to the coil. The multilayer body has a first end face and a second end face facing each other in a length direction, a first main surface and a second main surface facing each other in a height direction orthogonal to the length direction, and a first side surface and a second side surface facing each other in a width direction orthogonal to the length direction and the height direction. The coil is formed with a plurality of coil conductors laminated and electrically connected in the length direction. The first outer electrode spreads from part of the first end face over part of the first main surface of the multilayer body. The second outer electrode spreads from part of the second end face over part of the first main surface of the multilayer body. The laminating direction of the insulating layers and a direction of a coil axis of the coil are parallel to the first main surface of the multilayer body as a mount surface. The coil has a length in the length direction equal to or more than 85% of a length of the multilayer body in the length direction and equal to or less than 94% thereof (i.e., from 85% of a length of the multilayer body in the length direction to 94% thereof). When a line width of each of the coil conductors viewed from the length direction is taken as s (unit: μm), a length of the coil conductor in the length direction is taken as a (unit: μm), and a distance between the coil conductors adjacent to each other in the length direction is taken as b (unit: μm), coordinates (X, Y) where X=s and Y=a/(a+b) are present in a region formed by a straight line sequentially connecting a point A (40, 0.7), a point B (50, 0.6), a point C (60, 0.6), a point D (70, 0.5), a point E (80, 0.5), a point F (80, 0.8), a point G (50, 0.8), and a point H (40, 0.9).

According to the preferred embodiment of the present disclosure, a multilayer coil component that is excellent in high frequency characteristics and has a low direct current resistance can be provided.

Other features, elements, characteristics and advantages of the present disclosure will become more apparent from the following detailed description of preferred embodiments of the present disclosure (with reference to the attached drawings).

DETAILED DESCRIPTION

In the following, a multilayer coil component of the present disclosure is described. The present disclosure is not limited to the following structures, and may be modified as appropriate in a range not deviating from the gist of the present disclosure. The present disclosure also includes a combination of a plurality of preferable individual structures described below.

Multilayer Coil Component

Figure 1:
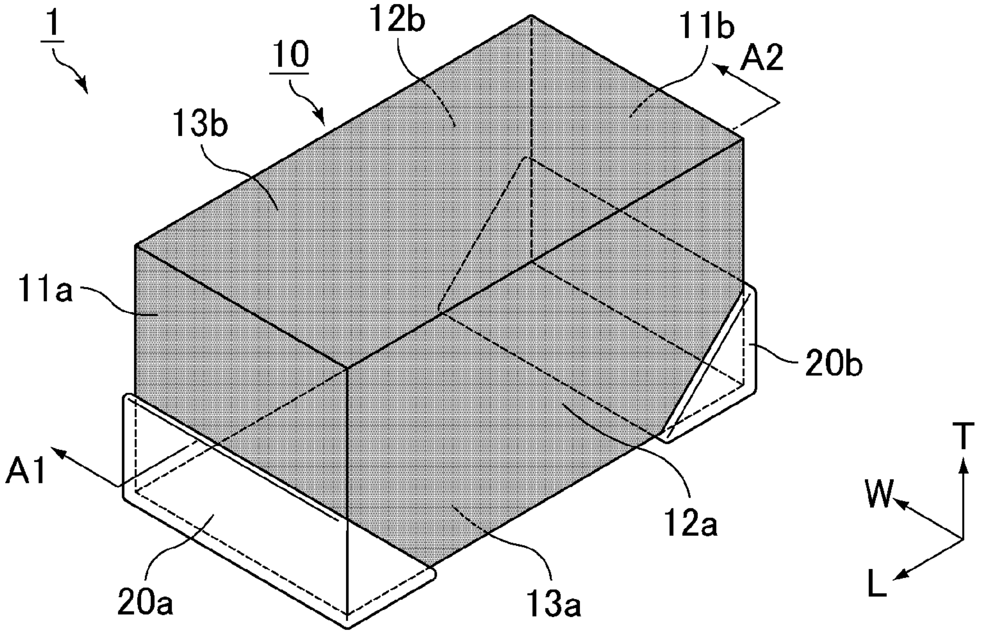
FIG. 1 is a schematic perspective view of one example of a multilayer coil component of the present disclosure.

FIG. 1 is a schematic perspective view of one example of the multilayer coil component of the present disclosure.

As depicted in FIG. 1, a multilayer coil component 1 has a multilayer body 10, a first outer electrode 20*a*, and a second outer electrode 20*b*. Although not depicted in FIG. 1, the multilayer coil component 1 also has a coil provided inside the multilayer body 10, as will be described further below.

In the present specification, it is assumed that a length direction, a width direction, and a height direction are directions defined as L, W, and T, respectively, as depicted in FIG. 1 and others. Here, the length direction L, the width direction W, and the height direction T are orthogonal to one another.

The multilayer body 10 has a substantially rectangular parallelepiped shape with six surfaces. The multilayer body 10 has a first end face 11*a* and a second end face 11*b* facing each other in the length direction L, a first side surface 12*a* and a second side surface 12*b* facing each other in the width direction W, and a first main surface 13*a* and a second main surface 13*b* facing each other in the height direction T.

When the multilayer coil component 1 is mounted on a substrate, the first main surface 13*a* of the multilayer body 10 serves as a mount surface.

The corner portions and the ridge portions of the multilayer body 10 are preferably rounded. Each corner portion of the multilayer body 10 is a portion where three surfaces of the multilayer body 10 cross one another. Each ridge portion of the multilayer body 10 is a portion where two surfaces of the multilayer body 10 cross each other.

Figure 2:
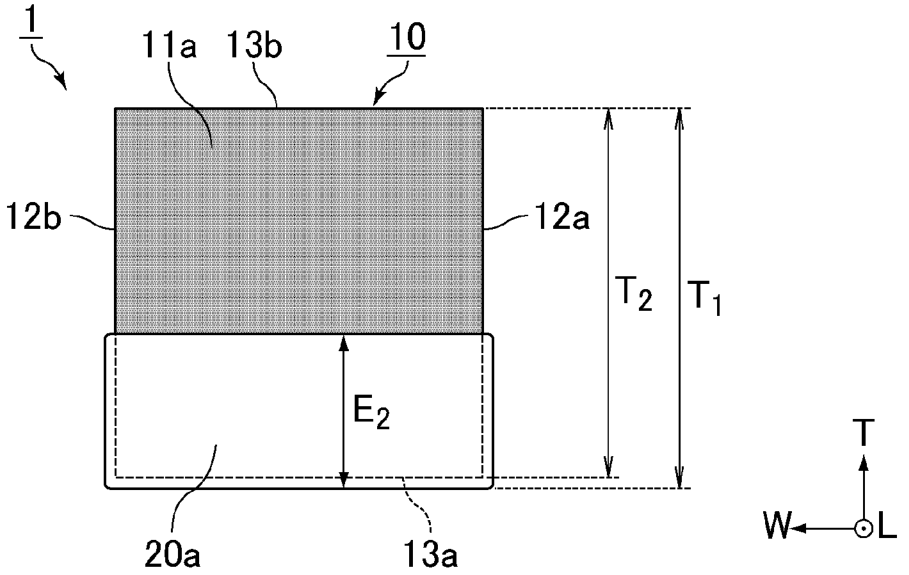
FIG. 2 is a schematic plan view of the multilayer coil component depicted in FIG. 1 when viewed from a first end face side of a multilayer body.
Figure 3:
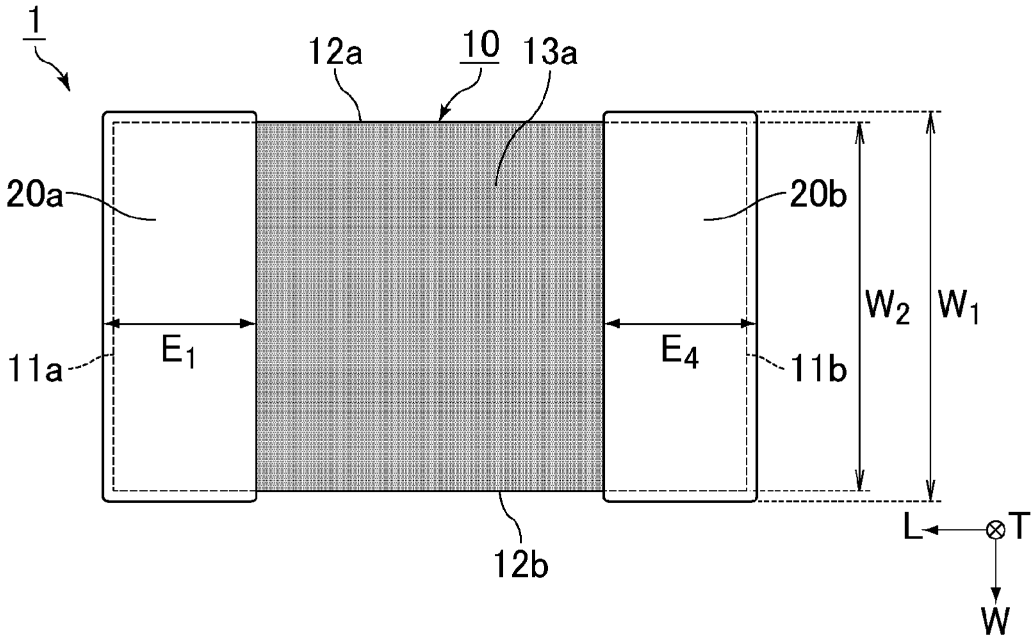
FIG. 3 is a schematic plan view of the multilayer coil component depicted in FIG. 1 when viewed from a first main surface side of the multilayer body.
Figure 4:
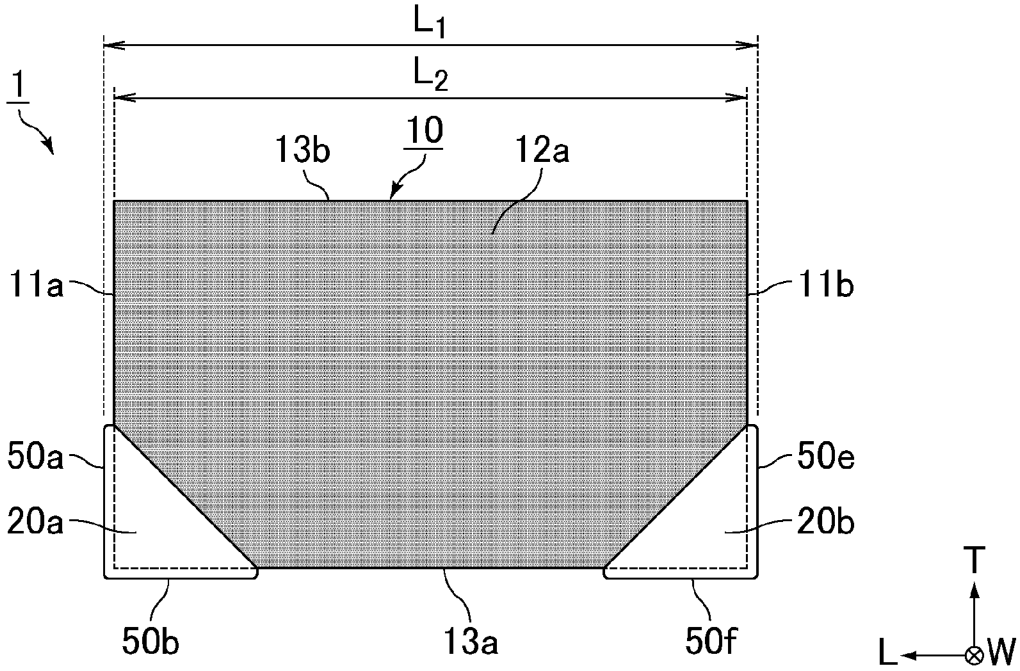
FIG. 4 is a schematic plan view of the multilayer coil component depicted in FIG. 1 when viewed from a first side surface side of the multilayer body.
Figure 5:
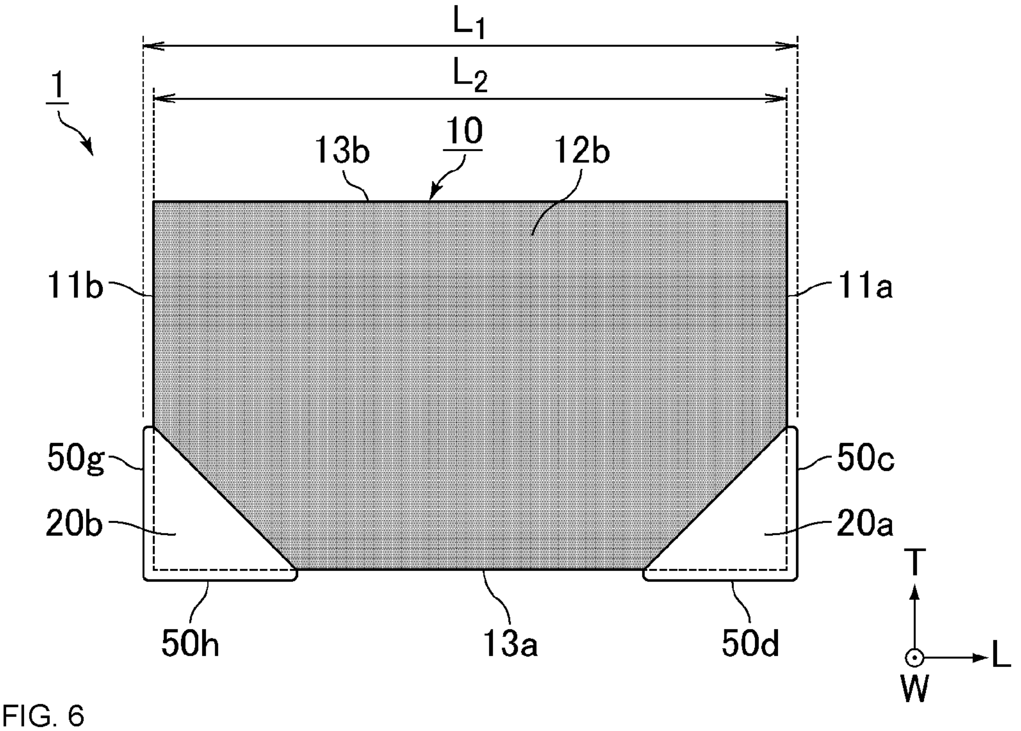
FIG. 5 is a schematic plan view of the multilayer coil component depicted in FIG. 1 when viewed from a second side surface side of the multilayer body.
Figure 6:
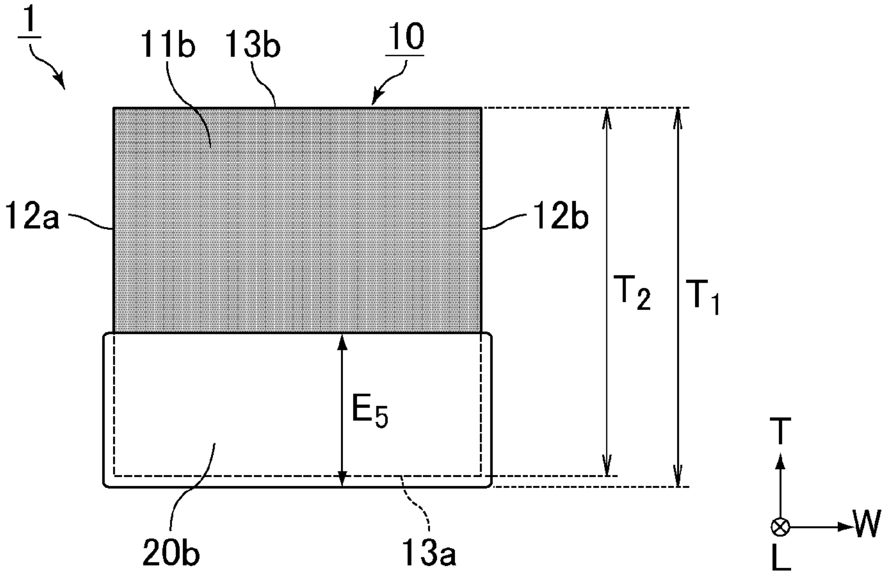
FIG. 6 is a schematic plan view of the multilayer coil component depicted in FIG. 1 when viewed from a second end face side of the multilayer body.

FIG. 2 is a schematic plan view of the multilayer coil component depicted in FIG. 1 when viewed from a first end face side of the multilayer body. FIG. 3 is a schematic plan view of the multilayer coil component depicted in FIG. 1 when viewed from a first main surface side of the multilayer body. FIG. 4 is a schematic plan view of the multilayer coil component depicted in FIG. 1 when viewed from a first side surface side of the multilayer body. FIG. 5 is a schematic plan view of the multilayer coil component depicted in FIG. 1 when viewed from a second side surface side of the multilayer body. FIG. 6 is a schematic plan view of the multilayer coil component depicted in FIG. 1 when viewed from a second end face side of the multilayer body.

As depicted in FIG. 1, FIG. 2, and FIG. 3, the first outer electrode 20*a* is provided on the surfaces of the multilayer body 10. More specifically, the first outer electrode 20*a* spreads from part of the first end face 11*a* of the multilayer body 10 over part of the first main surface 13*a*. With the first outer electrode 20*a* provided on part of the first main surface 13*a* of the multilayer body 10 as the mount surface, mountability of the multilayer coil component 1 is improved.

As depicted in FIG. 2, the first outer electrode 20*a* covers a region of the first end face 11*a* of the multilayer body 10, the region including the ridge portion crossing the first main surface 13*a*, and does not cover a region including the ridge portion crossing the second main surface 13*b*. Thus, the first end face 11*a* of the multilayer body 10 is exposed in the region including the ridge portion crossing the second main surface 13*b*.

When viewed along the length direction L, a length $E_2$ of the first outer electrode 20*a* in the height direction T is constant along the width direction W in FIG. 2, but may not be constant. For example, when viewed from the length direction L, the first outer electrode 20*a* may have a substantially rainbow shape so that the length $E_2$ in the height direction T increases from each end portion toward a center portion along the width direction W.

As depicted in FIG. 3, the first outer electrode 20*a* covers a region of the first main surface 13*a* of the multilayer body 10, the region including the ridge portion crossing the first end face 11*a*, and does not cover a region including the ridge portion crossing the second end face 11*b*.

When viewed from the height direction T, a length $E_1$ of the first outer electrode 20*a* in the length direction L is constant along the width direction W in FIG. 3, but may not be constant. For example, when viewed from the height direction T, the first outer electrode 20*a* may have a substantially rainbow shape so that the length $E_1$ in the length direction L increases from each end portion toward a center portion along the width direction W.

As depicted in FIG. 1, FIG. 4, and FIG. 5, the first outer electrode 20*a* may spread from part of the first end face 11*a* of the multilayer body 10 over part of the first main surface 13*a* and, furthermore, part of the first side surface 12*a* and part of the second side surface 12*b*. More specifically, the first outer electrode 20*a* covers a region of the first side surface 12*a* of the multilayer body 10, the region including a vertex crossing the first end face 11*a* and the first main surface 13*a*, and may not cover a region thereof including a vertex crossing the first end face 11*a* and the second main surface 13*b*. Also, the first outer electrode 20*a* covers a region of the second side surface 12*b* of the multilayer body 10, the region including a vertex crossing the first end face 11*a* and the first main surface 13*a*, and may not cover a region thereof including a vertex crossing the first end face 11*a* and the second main surface 13*b*.

As depicted in FIG. 4, in the first outer electrode 20*a*, contour lines of the portion covering the first side surface 12*a* of the multilayer body 10 preferably include, in addition to a first contour line 50*a* opposed to a ridge portion where the first side surface 12*a* and the first end face 11*a* cross each other and a second contour line 50*b* opposed to a ridge portion where the first side surface 12*a* and the first main surface 13*a* cross each other, a line diagonal to the first contour line 50*a* and the second contour line 50*b*.

As depicted in FIG. 5, in the first outer electrode 20*a*, contour lines of the portion covering the second side surface 12*b* of the multilayer body 10 preferably include, in addition to a third contour line 50*c* opposed to a ridge portion where the second side surface 12*b* and the first end face 11*a* cross each other and a fourth contour line 50*d* opposed to a ridge portion where the second side surface 12*b* and the first main surface 13*a* cross each other, a line diagonal to the third contour line 50*c* and the fourth contour line 50*d*.

The first outer electrode 20*a* may not be provided on the first side surface 12*a* of the multilayer body 10. Also, the first outer electrode 20*a* may not be provided on the second side surface 12*b* of the multilayer body 10.

As depicted in FIG. 1, FIG. 3, and FIG. 6, the second outer electrode 20*b* is provided on the surfaces of the multilayer body 10. More specifically, the second outer electrode 20*b* spreads from part of the second end face 11*b* of the multilayer body 10 over part of the first main surface 13*a*. With the second outer electrode 20*b* provided on part of the first main surface 13*a* of the multilayer body 10 as the mount surface, mountability of the multilayer coil component 1 is improved.

As depicted in FIG. 6, the second outer electrode 20*b* covers a region of the second end face 11*b* of the multilayer body 10, the region including the ridge portion crossing the first main surface 13*a*, and does not cover a region including the ridge portion crossing the second main surface 13*b*. Thus, the second end face 11*b* of the multilayer body 10 is exposed in a region including the ridge portion crossing the second main surface 13*b*.

When viewed from the length direction L, a length $E_5$ of the second outer electrode 20*b* in the height direction T is constant along the width direction W in FIG. 6, but may not be constant. For example, when viewed from the length direction L, the second outer electrode 20*b* may have a substantially rainbow shape so that the length $E_5$ in the height direction T increases from each end portion toward a center portion along the width direction W.

As depicted in FIG. 3, the second outer electrode 20*b* covers a region of the first main surface 13*a* of the multilayer body 10, the region including the ridge portion crossing the second end face 11*b*, and does not cover a region including the ridge portion crossing the first end face 11*a*.

When viewed from the height direction T, a length $E_4$ of the second outer electrode 20*b* in the length direction L is constant along the width direction W in FIG. 3, but may not be constant. For example, when viewed from the height direction T, the second outer electrode 20*b* may have a substantially rainbow shape so that the length $E_4$ in the length direction L increases from each end portion toward a center portion along the width direction W.

As depicted in FIG. 1, FIG. 4, and FIG. 5, the second outer electrode 20*b* may spread from part of the second end face 11*b* of the multilayer body 10 over part of the first main surface 13*a* and, furthermore, part of the first side surface 12*a* and part of the second side surface 12*b*. More specifically, the second outer electrode 20*b* covers a region of the first side surface 12*a* of the multilayer body 10, the region including a vertex crossing the second end face 11*b* and the first main surface 13*a*, and may not cover a region thereof including a vertex crossing the second end face 11*b* and the second main surface 13*b*. Also, the second outer electrode 20*b* covers a region of the second side surface 12*b* of the multilayer body 10, the region including a vertex crossing the second end face 11*b* and the first main surface 13*a*, and may not cover a region thereof including a vertex crossing the second end face 11*b* and the second main surface 13*b*.

As depicted in FIG. 4, in the second outer electrode 20*b*, contour lines of the portion covering the first side surface 12*a* of the multilayer body 10 preferably include, in addition to a fifth contour line 50*e* opposed to a ridge portion where the first side surface 12*a* and the second end face 11*b* cross each other and a sixth contour line 50*f* opposed to a ridge portion where the first side surface 12*a* and the first main surface 13*a* cross each other, a line diagonal to the fifth contour line 50*e* and the sixth contour line 50*f*.

As depicted in FIG. 5, in the second outer electrode 20*b*, contour lines of the portion covering the second side surface 12*b* of the multilayer body 10 preferably include, in addition to a seventh contour line 50*g* opposed to a ridge portion where the second side surface 12*b* and the second end face 11*b* cross each other and an eighth contour line 50*h* opposed to a ridge portion where the second side surface 12*b* and the first main surface 13*a* cross each other, a line diagonal to the seventh contour line 50*g* and the eighth contour line 50*h*.

The second outer electrode 20*b* may not be provided on the first side surface 12*a* of the multilayer body 10. Also, the second outer electrode 20*b* may not be provided on the second side surface 12*b* of the multilayer body 10.

The first outer electrode 20*a* and the second outer electrode 20*b* may each have a single-layer structure or multilayer structure.

When the first outer electrode 20*a* and the second outer electrode 20*b* each have a single-layer structure, examples of the material of each outer electrode include silver, gold, copper, palladium, nickel, aluminum, and an alloy containing at least one of these metals.

When the first outer electrode 20*a* and the second outer electrode 20*b* each have a multilayer structure, each outer electrode may have, for example, an underlying electrode layer containing silver, a nickel-plated film, and a tin-plated film, sequentially from a surface side of the multilayer body 10.

Preferable lengths of the multilayer coil component 1, the multilayer body 10, the first outer electrode 20*a*, and the second outer electrode 20*b* are described below.

The size of the multilayer coil component 1 is not particularly limited, but is preferably the 0603 size, 0402 size, or 1005 size.

(1) When the Multilayer Coil Component 1 is of the 0603 Size

A length $L_1$ of the multilayer coil component 1 in the length direction L is preferably approximately 0.57 mm or more. Also, the length $L_1$ of the multilayer coil component 1 in the length direction L is preferably approximately 0.63 mm or less. Thus, the length $L_1$ of the multilayer coil component 1 in the length direction L is from approximately 0.57 mm to approximately 0.63 mm.

A length $W_1$ of the multilayer coil component 1 in the width direction W is preferably approximately 0.27 mm or more. Also, the length $W_1$ of the multilayer coil component 1 in the width direction W is preferably approximately 0.33 mm or less. Thus, the length $W_1$ of the multilayer coil component 1 in the width direction W is preferably approximately 0.27 mm to approximately 0.33 mm.

A length $T_1$ of the multilayer coil component 1 in the height direction T is preferably approximately 0.27 mm or more. Also, the length $T_1$ of the multilayer coil component 1 in the height direction T is preferably approximately 0.33 mm or less Thus, the length $T_1$ of the multilayer coil component 1 in the height direction T is preferably from approximately 0.27 mm to approximately 0.33 mm.

A length $L_2$ of the multilayer body 10 in the length direction L is preferably approximately 0.57 mm or more. Also, the length $L_2$ of the multilayer body 10 in the length direction L is preferably approximately 0.63 mm or less. Thus, the length $L_2$ of the multilayer body 10 in the length direction L is preferably from approximately 0.57 mm to approximately 0.63 mm.

A length $W_2$ of the multilayer body 10 in the width direction W is preferably approximately 0.27 mm or more. Also, the length $W_2$ of the multilayer body 10 in the width direction W is preferably approximately 0.33 mm or less. Thus, the length $W_2$ of the multilayer body 10 in the width direction W is preferably from approximately 0.27 mm to approximately 0.33 mm.

A length $T_2$ of the multilayer body 10 in the height direction T is preferably approximately 0.27 mm or more. Also, the length $T_2$ of the multilayer body 10 in the height direction T is preferably approximately 0.33 mm or less. Thus, the length $T_2$ of the multilayer body 10 in the height direction T is preferably from approximately 0.27 mm to approximately 0.33 mm.

The length $E_2$ of the first outer electrode 20*a* in the height direction T is preferably approximately 0.10 mm or more and approximately 0.20 mm or less (i.e., from approximately 0.10 mm to approximately 0.20 mm). When the length $E_2$ of the first outer electrode 20*a* in the height direction T is not constant along the width direction W, its maximum value is preferably within the above-described range.

The length $E_1$ of the first outer electrode 20*a* in the length direction L is preferably approximately 0.12 mm or more and approximately 0.22 mm or less (i.e., from approximately 0.12 mm to approximately 0.22 mm). When the length $E_1$ of the first outer electrode 20*a* in the length direction L is not constant along the width direction W, its maximum value is preferably within the above-described range.

The length $E_5$ of the second outer electrode 20*b* in the height direction T is preferably approximately 0.10 mm or more and approximately 0.20 mm or less (i.e., from approximately 0.10 mm to approximately 0.20 mm). When the length $E_5$ of the second outer electrode 20*b* in the height direction T is not constant along the width direction W, its maximum value is preferably within the above-described range.

The length $E_4$ of the second outer electrode 20*b* in the length direction L is preferably approximately 0.12 mm or more and approximately 0.22 mm or less (i.e., from approximately 0.12 mm to approximately 0.22 mm). When the length $E_4$ of the second outer electrode 20*b* in the length direction L is not constant along the width direction W, its maximum value is preferably within the above-described range.

(2) When the Multilayer Coil Component 1 is of the 0402 Size

The length $L_1$ of the multilayer coil component 1 in the length direction L is preferably approximately 0.38 mm or more. Also, the length $L_1$ of the multilayer coil component 1 in the length direction L is preferably approximately 0.42 mm or less. Thus, the length $L_1$ of the multilayer coil component 1 in the length direction L is preferably from approximately 0.38 mm to approximately 0.42 mm.

The length $W_1$ of the multilayer coil component 1 in the width direction W is preferably approximately 0.18 mm or more. Also, the length $W_1$ of the multilayer coil component 1 in the width direction W is preferably approximately 0.22 mm or less. Thus, the length $W_1$ of the multilayer coil component 1 in the width direction W is preferably from approximately 0.18 mm to approximately 0.22 mm.

The length $T_1$ of the multilayer coil component 1 in the height direction T is preferably approximately 0.18 mm or more. Also, the length $T_1$ of the multilayer coil component 1 in the height direction T is preferably approximately 0.22 mm or less. Thus, the length $T_1$ of the multilayer coil component 1 in the height direction T is preferably from approximately 0.18 mm to approximately 0.22 mm.

The length $L_2$ of the multilayer body 10 in the length direction L is preferably approximately 0.38 mm or more. Also, the length $L_2$ of the multilayer body 10 in the length direction L is preferably approximately 0.42 mm or less. Thus, the length $L_2$ of the multilayer body 10 in the length direction L is preferably from approximately 0.38 mm to approximately 0.42 mm.

The length $W_2$ of the multilayer body 10 in the width direction W is preferably approximately 0.18 mm or more. Also, the length $W_2$ of the multilayer body 10 in the width direction W is preferably approximately 0.22 mm or less. Thus, the length $W_2$ of the multilayer body 10 in the width direction W is preferably from approximately 0.18 mm to approximately 0.22 mm.

The length $T_2$ of the multilayer body 10 in the height direction T is preferably approximately 0.18 mm or more. Also, the length $T_2$ of the multilayer body 10 in the height direction T is preferably approximately 0.22 mm or less. Thus, the length $T_2$ of the multilayer body 10 in the height direction T is preferably from approximately 0.18 mm to approximately 0.22 mm.

The length $E_2$ of the first outer electrode 20*a* in the height direction T is preferably approximately 0.06 mm or more and approximately 0.13 mm or less (i.e., from approximately 0.06 mm to approximately 0.13 mm). When the length $E_2$ of the first outer electrode 20*a* in the height direction T is not constant along the width direction W, its maximum value is preferably within the above-described range.

The length $E_1$ of the first outer electrode 20*a* in the length direction L is preferably approximately 0.08 mm or more and approximately 0.15 mm or less (i.e., from approximately 0.08 mm to approximately 0.15 mm). When the length $E_1$ of the first outer electrode 20*a* in the length direction L is not constant along the width direction W, its maximum value is preferably within the above-described range.

The length $E_5$ of the second outer electrode 20*b* in the height direction T is preferably approximately 0.06 mm or more and approximately 0.13 mm or less (i.e., from approximately 0.06 mm to approximately 0.13 mm). When the length $E_5$ of the second outer electrode 20*b* in the height direction T is not constant along the width direction W, its maximum value is preferably within the above-described range.

The length $E_4$ of the second outer electrode 20*b* in the length direction L is preferably approximately 0.08 mm or more and approximately 0.15 mm or less (i.e., from approximately 0.08 mm to approximately 0.15 mm). When the length $E_4$ of the second outer electrode 20*b* in the length direction L is not constant along the width direction W, its maximum value is preferably within the above-described range.

(3) When the Multilayer Coil Component 1 is of the 1005 Size

The length $L_1$ of the multilayer coil component 1 in the length direction L is preferably approximately 0.95 mm or more. Also, the length $L_1$ of the multilayer coil component 1 in the length direction L is preferably approximately 1.05 mm or less. Thus, the length $L_1$ of the multilayer coil component 1 in the length direction L is preferably from approximately 0.95 mm to approximately 1.05 mm.

The length $W_1$ of the multilayer coil component 1 in the width direction W is preferably approximately 0.45 mm or more. Also, the length $W_1$ of the multilayer coil component 1 in the width direction W is preferably approximately 0.55 mm or less. Thus, the length $W_1$ of the multilayer coil component 1 in the width direction W is preferably from approximately 0.45 mm to approximately 0.55 mm.

The length $T_1$ of the multilayer coil component 1 in the height direction T is preferably approximately 0.45 mm or more. Also, the length $T_1$ of the multilayer coil component 1 in the height direction T is preferably approximately 0.55 mm or less. Thus, the length $T_1$ of the multilayer coil component 1 in the height direction T is preferably from approximately 0.45 mm to approximately 0.55 mm.

The length $L_2$ of the multilayer body 10 in the length direction L is preferably approximately 0.95 mm or more. Also, the length $L_2$ of the multilayer body 10 in the length direction L is preferably approximately 1.05 mm or less. Thus, the length $L_2$ of the multilayer body 10 in the length direction L is preferably from approximately 0.95 mm to approximately 1.05 mm.

The length $W_2$ of the multilayer body 10 in the width direction W is preferably approximately 0.45 mm or more. Also, the length $W_2$ of the multilayer body 10 in the width direction W is preferably approximately 0.55 mm or less. Thus, the length $W_2$ of the multilayer body 10 in the width direction W is from preferably approximately 0.45 mm to approximately 0.55 mm.

The length $T_2$ of the multilayer body 10 in the height direction T is preferably approximately 0.45 mm or more. Also, the length $T_2$ of the multilayer body 10 in the height direction T is preferably approximately 0.55 mm or less. Thus, the length $T_2$ of the multilayer body 10 in the height direction T is preferably from approximately 0.45 mm to approximately 0.55 mm.

The length $E_2$ of the first outer electrode 20*a* in the height direction T is preferably approximately 0.15 mm or more and approximately 0.33 mm or less (i.e., from approximately 0.15 mm to approximately 0.33 mm). When the length $E_2$ of the first outer electrode 20*a* in the height direction T is not constant along the width direction W, its maximum value is preferably within the above-described range.

The length $E_1$ of the first outer electrode 20*a* in the length direction L is preferably approximately 0.20 mm or more and approximately 0.38 mm or less (i.e., from approximately 0.20 mm to approximately 0.38 mm). When the length $E_1$ of the first outer electrode 20*a* in the length direction L is not constant along the width direction W, its maximum value is preferably within the above-described range.

The length $E_5$ of the second outer electrode 20*b* in the height direction T is preferably approximately 0.15 mm or more and approximately 0.33 mm or less (i.e., from approximately 0.15 mm to approximately 0.33 mm). When the length $E_5$ of the second outer electrode 20*b* in the height direction T is not constant along the width direction W, its maximum value is preferably within the above-described range.

The length $E_4$ of the second outer electrode 20*b* in the length direction L is preferably approximately 0.20 mm or more and approximately 0.38 mm or less (i.e., from approximately 0.20 mm to approximately 0.38 mm). When the length $E_4$ of the second outer electrode 20*b* in the length direction L is not constant along the width direction W, its maximum value is preferably within the above-described range.

Figure 7:
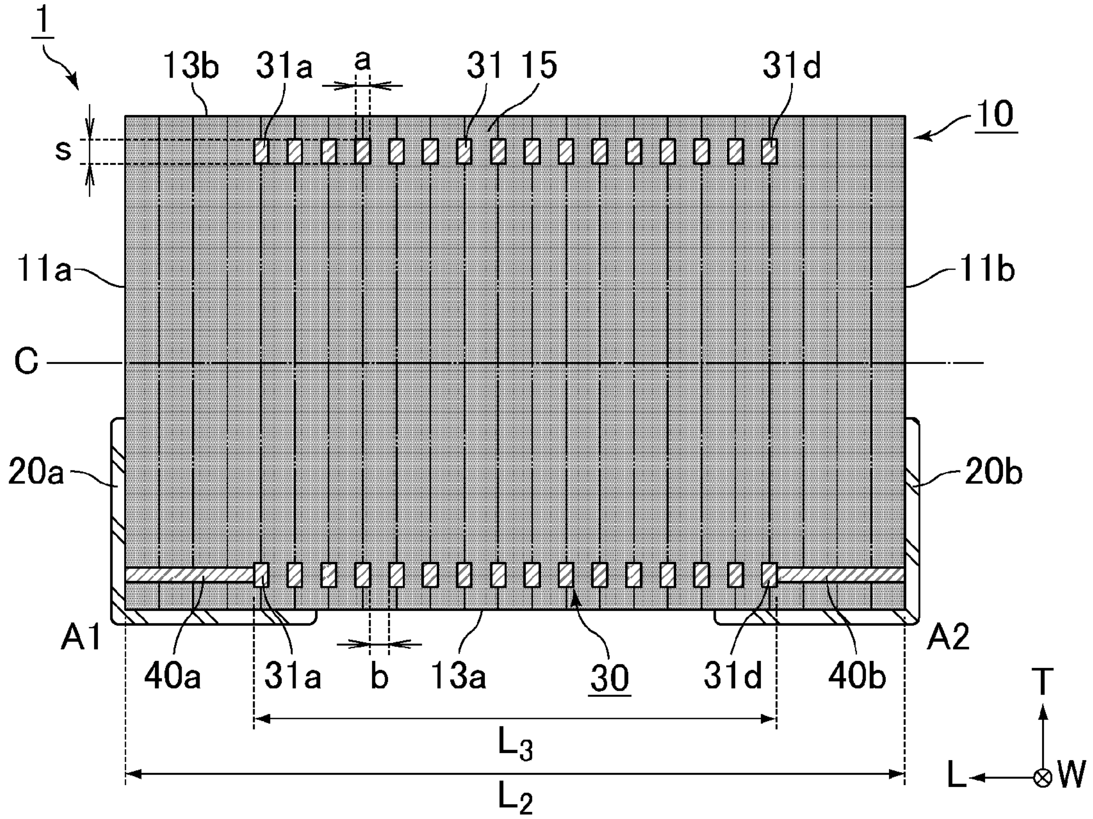
FIG. 7 is a schematic sectional view of a portion corresponding to a line segment A1-A2 in FIG. 1.

FIG. 7 is a schematic sectional view of a portion corresponding to a line segment A1-A2 in FIG. 1.

As depicted in FIG. 7, the multilayer body 10 is formed with a plurality of insulating layers 15 laminated in the length direction L. That is, the laminating direction of the insulating layers 15 is along the length direction L and is parallel to the first main surface 13*a* of the multilayer body 10 as the mount surface. While boundaries of these insulating layers 15 are depicted in FIG. 7 for convenience of description, in practice, these boundaries may not clearly appear.

Inside the multilayer body 10, a coil 30 is provided. The coil 30 is formed with a plurality of coil conductors 31 laminated together with the insulating layers 15 and electrically connected in the length direction L, and has, for example, a substantially solenoid shape. In FIG. 7, the shape of the coil 30, the positions of the coil conductors 31, connections of the coil conductors 31, and others are not strictly depicted. For example, the coil conductors 31 adjacent to each other in the length direction L are electrically connected to each other via a via conductor not depicted in FIG. 7.

The coil 30 has a coil axis C. The coil axis C of the coil 30 spreads in the length direction L and penetrates between the first end face 11*a* and the second end face 11*b* of the multilayer body 10. That is, the direction of the coil axis C of the coil 30 is parallel to the first main surface 13*a* of the multilayer body 10 as the mount surface. Also, the coil axis C of the coil 30 passes through the barycenter of the shape of the coil 30 when viewed from the length direction L.

In FIG. 7, while the laminating direction of the insulating layer 15 and the direction of the coil axis C of the coil 30 are parallel along the length direction L, but these directions may not be parallel. For example, the laminating direction of the insulating layer 15 may be along the width direction W and the direction of the coil axis C of the coil 30 may be along the length direction L. Even in this case, the laminating direction of the insulating layer 15 and the direction of the coil axis C of the coil 30 are parallel to the first main surface 13*a* of the multilayer body 10 as the mount surface.

The multilayer body 10 may be further provided with a first coupling conductor 40*a* and a second coupling conductor 40*b*.

The first coupling conductor 40*a* is formed with via conductors not depicted in FIG. 7 laminated together with the insulating layers 15 and electrically connected in the length direction L. The first coupling conductor 40*a* is exposed from the first end face 11*a* of the multilayer body 10.

The first outer electrode 20*a* is electrically connected to the coil 30 via the first coupling conductor 40*a*. Here, among the plurality of coil conductors 31, a coil conductor 31*a* is provided at a position closest to the first end face 11*a* of the multilayer body 10. Thus, the first outer electrode 20*a* is electrically connected to the coil conductor 31*a* via the first coupling conductor 40*a*.

The first coupling conductor 40*a* connects the first outer electrode 20*a* and the coil 30. The first coupling conductor 40*a* preferably connects the first outer electrode 20*a* and the coil 30, here, the first outer electrode 20*a* and the coil conductor 31*a*, in a linear manner. Also, when viewed from the length direction L, the first coupling conductor 40*a* preferably overlaps the coil conductor 31*a* and is positioned on a first main surface 13*a* side of the multilayer body 10 as the mount surface with respect to the coil axis C. These facilitate electrical connection between the first outer electrode 20*a* and the coil 30.

The first coupling conductor 40*a* connects the first outer electrode 20*a* and the coil 30 in a linear manner, indicating that the via conductors configuring the first coupling conductor 40*a* overlap one another when viewed from the length direction L. The via conductors configuring the first coupling conductor 40*a* may not be aligned strictly in a linear manner.

The first coupling conductor 40*a* is preferably connected to a portion of the coil conductor 31*a* closest to the first main surface 13*a* of the multilayer body 10. This allows a decrease in the area of a portion of the first outer electrode 20*a* on the first end face 11*a* of the multilayer body 10. As a result, the stray capacitance between the first outer electrode 20*a* and the coil 30 is decreased, thereby improving the high frequency characteristics of the multilayer coil component 1.

Only one first coupling conductor 40*a* may be provided, or a plurality of first coupling conductors 40*a* may be provided.

The second coupling conductor 40*b* is formed with via conductors not depicted in FIG. 7 laminated together with the insulating layers 15 and electrically connected in the length direction L. The second coupling conductor 40*b* is exposed from the second end face 11*b* of the multilayer body 10.

The second outer electrode 20*b* is electrically connected to the coil 30 via the second coupling conductor 40*b*. Here, among the plurality of coil conductors 31, a coil conductor 31*d* is provided at a position closest to the second end face 11*b* of the multilayer body 10. Thus, the second outer electrode 20*b* is electrically connected to the coil conductor 31*d* via the second coupling conductor 40*b*.

The second coupling conductor 40*b* connects the second outer electrode 20*b* and the coil 30. The second coupling conductor 40*b* preferably connects the second outer electrode 20*b* and the coil 30, here, the second outer electrode 20*b* and the coil conductor 31*d*, in a linear manner. Also, when viewed from the length direction L, the second coupling conductor 40*b* preferably overlaps the coil conductor 31*d* and is positioned on the first main surface 13*a* side of the multilayer body 10 as the mount surface with respect to the coil axis C. These facilitate electrical connection between the second outer electrode 20*b* and the coil 30.

The second coupling conductor 40*b* connects the second outer electrode 20*b* and the coil 30 in a linear manner, indicating that the via conductors configuring the second coupling conductor 40*b* overlap one another when viewed from the length direction L. The via conductors configuring the second coupling conductor 40*b* may not be aligned strictly in a linear manner.

The second coupling conductor 40*b* is preferably connected to a portion of the coil conductor 31*d* closest to the first main surface 13*a* of the multilayer body 10. This allows a decrease in the area of a portion of the second outer electrode 20*b* on the second end face 11*b* of the multilayer body 10. As a result, the stray capacitance between the second outer electrode 20*b* and the coil 30 is decreased, thereby improving the high frequency characteristics of the multilayer coil component 1.

Only one second coupling conductor 40*b* may be provided, or a plurality of second coupling conductors 40*b* may be provided.

A length $L_3$ of the coil 30 in the length direction L is approximately 85% or more of the length $L_2$ of the multilayer body 10 in the length direction L and approximately 94% or less thereof (i.e., from approximately 85% of the length $L_2$ of the multilayer body 10 in the length direction L to approximately 94% thereof), preferably approximately 90% or more and approximately 94% or less thereof (i.e., from approximately 90% to approximately 94% thereof). Here, the length $L_3$ of the coil 30 in the length direction L indicates a distance in the length direction L from the coil conductor 31*a* electrically connected to the first outer electrode 20*a* via the first coupling conductor 40*a* to the coil conductor 31*d* electrically connected to the second outer electrode 20*b* via the second coupling conductor 40*b* (including the length of each of the above-described coil conductor 31*a* and the coil conductor 31*d* in the length direction L). That is, the length $L_3$ of the coil 30 in the length direction L indicates the length of a region of arrangement of the coil conductors 31 in the length direction L. If the length $L_3$ of the coil 30 in the length direction L is less than approximately 85% of the length $L_2$ of the multilayer body 10 in the length direction L, the stray capacitance of the coil 30 is increased, thereby degrading the high frequency characteristics of the multilayer coil component 1. If the length $L_3$ of the coil 30 in the length direction L is more than approximately 94% of the length $L_2$ of the multilayer body 10 in the length direction L, the stray capacitance between the first outer electrode 20*a* and the coil 30 is increased, and the stray capacitance between the second outer electrode 20*b* and the coil 30 is also increased, thereby degrading the high frequency characteristics of the multilayer coil component 1.

As described above, with the length $L_3$ of the coil 30 in the length direction L being approximately 85% or more of the length $L_2$ of the multilayer body 10 in the length direction L and approximately 94% or less thereof (i.e., from approximately 85% of the length $L_2$ of the multilayer body 10 in the length direction L to approximately 94% thereof), the high frequency characteristics of the multilayer coil component 1 are improved. In this state, if the length of each coil conductor 31 in the length direction L is increased, the direct current resistance can be decreased, but the distance between the coil conductors 31 adjacent to each other in the length direction L is decreased, thereby increasing the stray capacitance of the coil 30 and, as a result, degrading the high frequency characteristics of the multilayer coil component 1. To address this, in the multilayer coil component 1, by adjusting the line width of each coil conductor 31 when viewed from the length direction L, the length of the coil conductor 31 in the length direction L, and the distance between the coil conductors 31 adjacent to each other in the length direction L, a range the specification of the coil conductor 31 satisfies is limited as described below.

Figure 8:
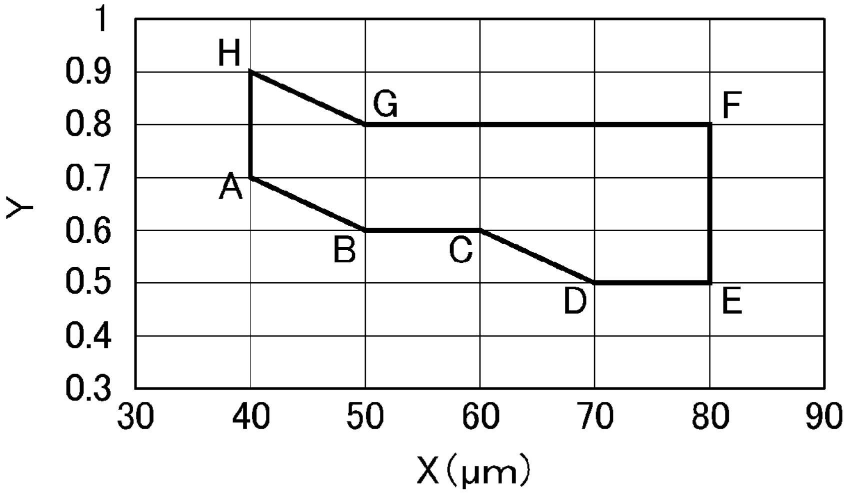
FIG. 8 is a diagram of a range the specification of a coil conductor satisfies in the multilayer coil component of the present disclosure.

FIG. 8 is a diagram of a range the specification of a coil conductor satisfies in the multilayer coil component of the present disclosure. When the line width of each coil conductor 31 viewed from the length direction L is taken as s (unit: μm), the length of the coil conductor 31 in the length direction L is taken as a (unit: μm), and a distance between the coil conductors 31 adjacent to each other in the length direction L is taken as b (unit: μm), coordinates (X, Y) where X=s and Y=a/(a+b) are present, as depicted in FIG. 8, in a region formed by a straight line sequentially connecting a point A (40, 0.7), a point B (50, 0.6), a point C (60, 0.6), a point D (70, 0.5), a point E (80, 0.5), a point F (80, 0.8), a point G (50, 0.8), and a point H (40, 0.9). With the coil conductor 31 satisfying the above-described specification, together with the effect in which the length $L_3$ of the coil 30 in the length direction L is approximately 85% or more of the length $L_2$ of the multilayer body 10 in the length direction L and approximately 94% or less thereof (i.e., from approximately 85% of the length $L_2$ of the multilayer body 10 in the length direction L to approximately 94% thereof), the multilayer coil component 1 is excellent in high frequency characteristics and has a low direct current resistance.

When the coil conductor 31 satisfies the above-described specification, the multilayer coil component 1 can be suitably used in, for example, a Bias-Tee circuit in an optical communication circuit.

Figure 9:
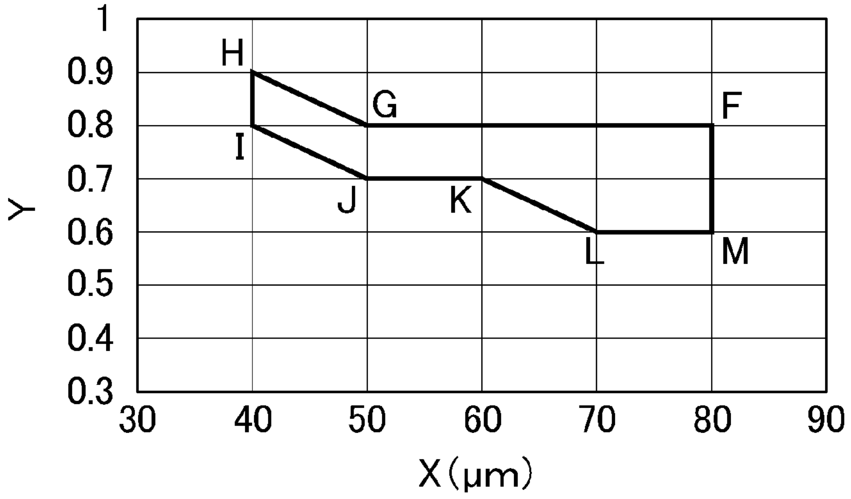
FIG. 9 is a diagram of a preferable range the specification of the coil conductor satisfies in the multilayer coil component of the present disclosure.

FIG. 9 is a diagram of a preferable range the specification of the coil conductor satisfies in the multilayer coil component of the present disclosure. The coordinates (X, Y) are preferably present, as depicted in FIG. 9, in a region formed by a straight line sequentially connecting a point I (40, 0.8), a point J (50, 0.7), a point K (60, 0.7), a point L (70, 0.6), a point M (80, 0.6), the point F (80, 0.8), the point G (50, 0.8), and the point H (40, 0.9). With the coil conductor 31 satisfying the above-described specification, the direct current resistance of the multilayer coil component 1 is further decreased.

From a viewpoint of decreasing the direct current resistance of the multilayer coil component 1, the coordinates (X, Y) may be present in a region formed by a straight line sequentially connecting the point B (50, 0.6), the point C (60, 0.6), the point D (70, 0.5), the point E (80, 0.5), the point F (80, 0.8), and the point G (50, 0.8).

Modes in which the coordinates (X, Y) are present in a region formed by a straight line sequentially connecting a plurality of points include, as a matter of course, the mode in which the coordinates (X, Y) are present inside the above-described region, and also a mode in which the coordinates (X, Y) are present on a straight line configuring an outer edge of the above-described region (for example, a straight line AB in FIG. 8).

Figure 10:
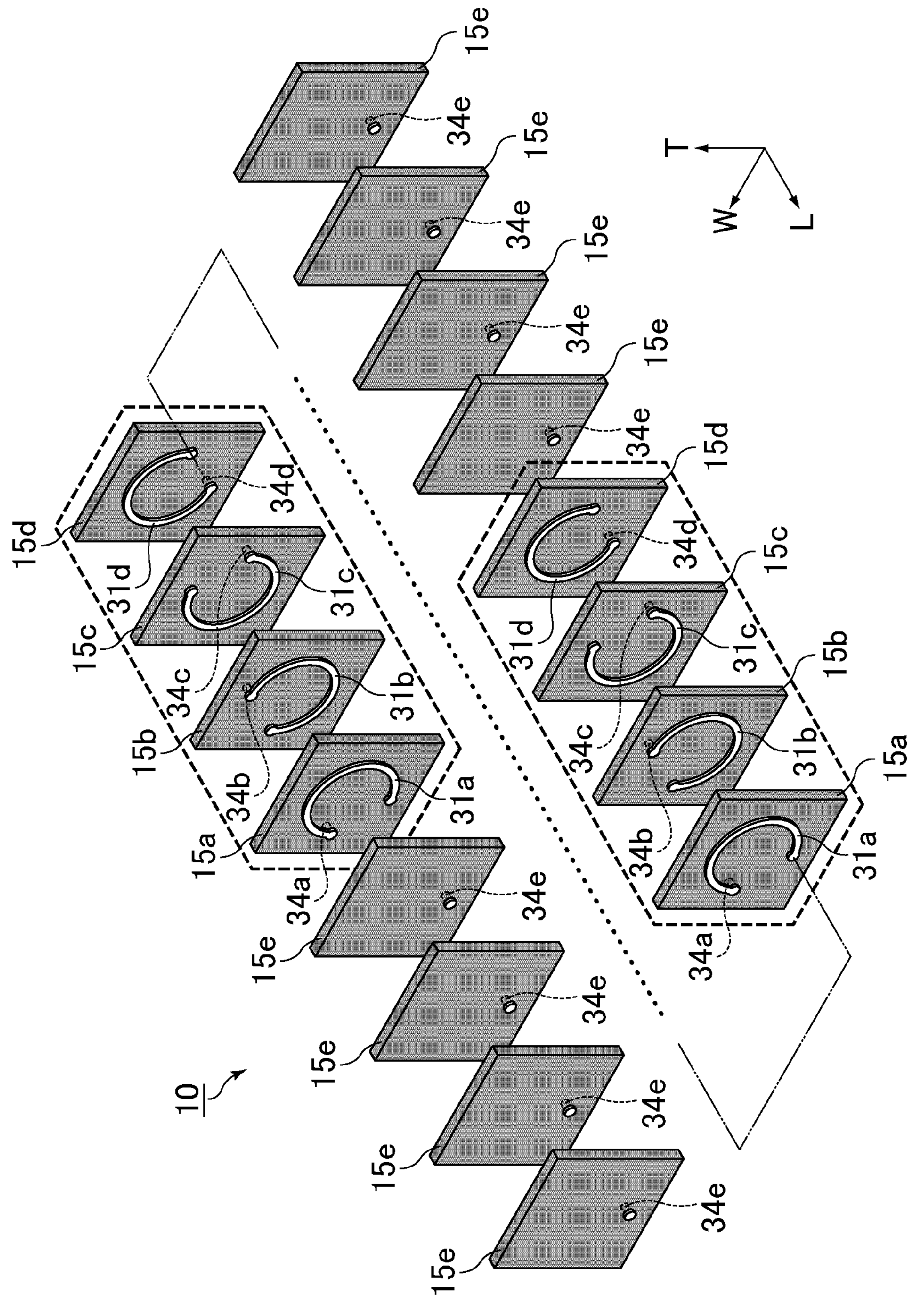
FIG. 10 is a schematic exploded perspective view of one example of the multilayer body depicted in FIG. 7.
Figure 11:
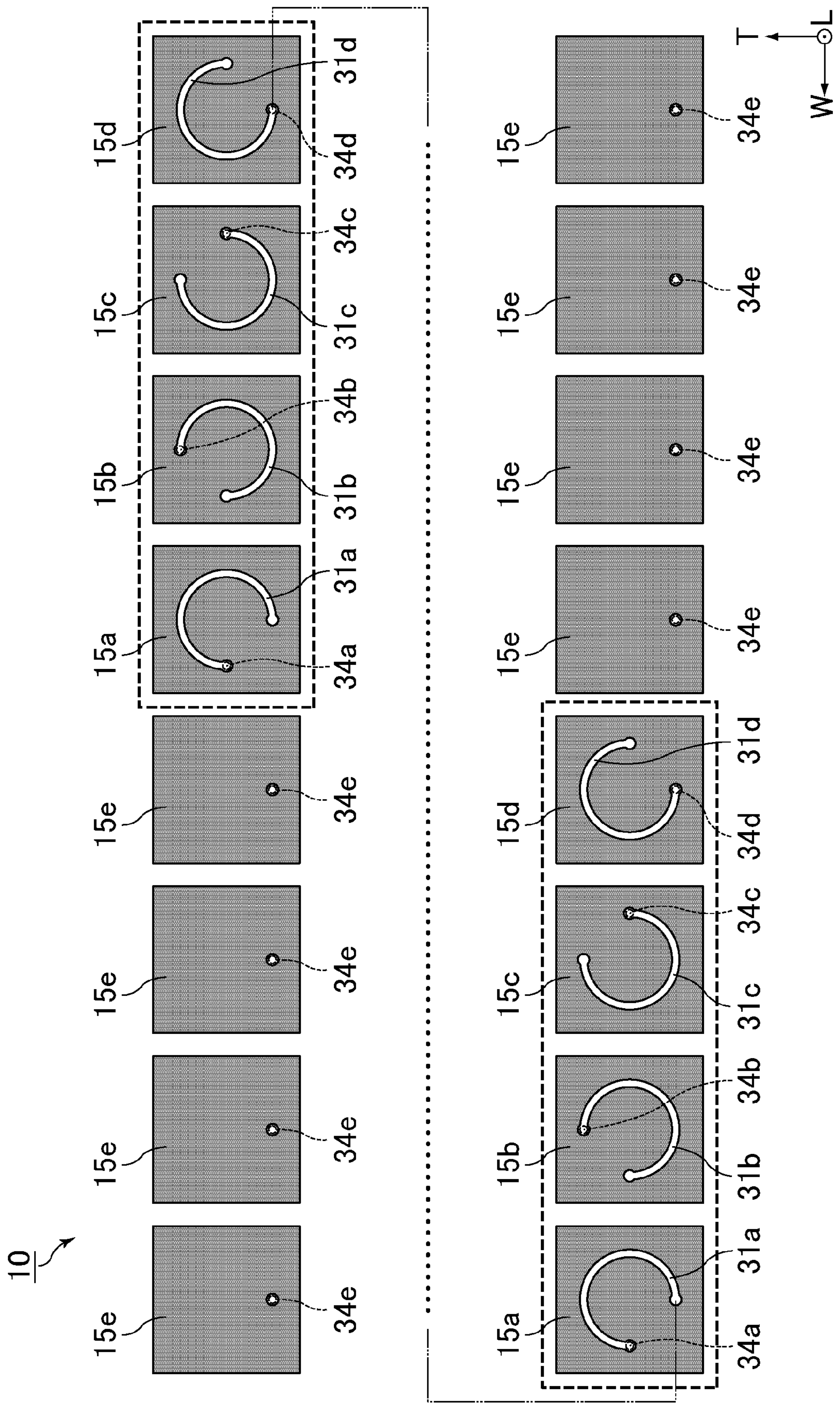
FIG. 11 is a schematic exploded plan view of one example of the multilayer body depicted in FIG. 7.

FIG. 10 is a schematic exploded perspective view of one example of the multilayer body depicted in FIG. 7. FIG. 11 is a schematic exploded plan view of one example of the multilayer body depicted in FIG. 7.

As depicted in FIG. 10 and FIG. 11, the multilayer body 10 is formed with insulating layers 15*a*, insulating layers 15*b*, insulating layers 15*c*, insulating layers 15*d*, and insulating layers 15*e*, as the insulating layers 15, laminated in the laminating direction, here, in the length direction L.

In the present specification, the insulating layers 15*a*, the insulating layers 15*b*, the insulating layers 15*c*, the insulating layers 15*d*, and the insulating layers 15*e* are simply referred to as the insulating layers 15 if they are not particularly distinguished from one another.

The coil conductor 31*a*, a coil conductor 31*b*, a coil conductor 31*c*, and the coil conductor 31*d* as the coil conductor 31 are respectively provided on main surfaces of the insulating layer 15*a*, the insulating layer 15*b*, the insulating layer 15*c*, and the insulating layer 15*d*. The coil conductor 31*a*, the coil conductor 31*b*, the coil conductor 31*c*, and the coil conductor 31*d* are respectively laminated together with the insulating layer 15*a*, the insulating layer 15*b*, the insulating layer 15*c*, and the insulating layer 15*d* and electrically connected in the length direction L. This configures the coil 30 depicted in FIG. 7.

In the present specification, the coil conductor 31*a*, the coil conductor 31*b*, the coil conductor 31*c*, and the coil conductor 31*d* are simply referred to as the coil conductor 31 if they are not particularly distinguished from one another.

The length of each of the coil conductor 31*a*, the coil conductor 31*b*, the coil conductor 31*c*, and the coil conductor 31*d* is ¾ turns of the coil 30. That is, the number of lamination of coil conductors for configuring three turns of the coil 30 is four. In the multilayer body 10, one coil conductor 31*a*, one coil conductor 31*b*, one coil conductor 31*c*, and one coil conductor 31*d* form one unit (for three turns) and are repeatedly laminated.

Each of both ends of the coil conductor 31 may be provided with a land portion. More specifically, each of both ends of each of the coil conductor 31*a*, the coil conductor 31*b*, the coil conductor 31*c*, and the coil conductor 31*d* may be provided with a land portion.

The diameter of the land portion of the coil conductor 31 when viewed from the length direction L is preferably larger than the line width s of the coil conductor 31 except the land portion. When viewed from the length direction L, the land portion of the coil conductor 31 may have a substantially circular shape or a substantially polygonal shape. When the land portion of the coil conductor 31 has a substantially polygonal shape viewed from the length direction L, the diameter of a circle corresponding to the area of the substantially polygonal shape is taken as the diameter of the land portion.

A via conductor 34*a*, a via conductor 34*b*, a via conductor 34*c*, and a via conductor 34*d* are respectively provided in the insulating layer 15*a*, the insulating layer 15*b*, the insulating layer 15*c*, and the insulating layer 15*d*, so as to penetrate in the length direction L.

The via conductor 34*a*, the via conductor 34*b*, the via conductor 34*c*, and the via conductor 34*d* are respectively connected to one end of the coil conductor 31*a*, the coil conductor 31*b*, the coil conductor 31*c*, and the coil conductor 31*d*. As described above, when each of both ends of the coil conductor 31*a*, the coil conductor 31*b*, the coil conductor 31*c*, and the coil conductor 31*d* is provided with a land portion, the via conductor 34*a*, the via conductor 34*b*, the via conductor 34*c*, and the via conductor 34*d* are respectively connected to the land portion of the coil conductor 31*a*, the land portion of the coil conductor 31*b*, the land portion of the coil conductor 31*c*, and the land portion of the coil conductor 31*d*.

The insulating layer 15*a* with the coil conductor 31*a* and the via conductor 34*a*, the insulating layer 15*b* with the coil conductor 31*b* and the via conductor 34*b*, the insulating layer 15*c* with the coil conductor 31*c* and the via conductor 34*c*, and the insulating layer 15*d* with the coil conductor 31*d* and the via conductor 34*d* are repeatedly laminated as one unit (a portion surrounded by a dotted line in FIG. 10 and FIG. 11). This makes the coil conductor 31*a*, the coil conductor 31*b*, the coil conductor 31*c*, and the coil conductor 31*d* electrically connected via the via conductor 34*a*, the via conductor 34*b*, the via conductor 34*c*, and the via conductor 34*d*. That is, the coil conductors adjacent to each other in the length direction L are electrically connected to each other via the via conductor.

This configures the coil 30 in a substantially solenoid shape provided inside the multilayer body 10.

When viewed from the length direction L, the coil 30 may have a substantially circular shape or a substantially polygonal shape.

In each insulating layer 15*e*, a via conductor 34*e* is provided so as to penetrate in the length direction L.

On a main surface of the insulating layer 15*e*, a land portion connected to the via conductor 34*e* may be provided.

The plurality of insulating layers 15*e* each with the via conductor 34*e* are laminated so as to overlap the insulating layer 15*a* with the coil conductor 31*a* and the via conductor 34*a* positioned at one end side of the coil 30. This makes the via conductors 34*e* electrically connected to one another to configure the first coupling conductor 40*a*, and the first coupling conductor 40*a* is exposed from the first end face 11*a* of the multilayer body 10. As a result, the first outer electrode 20*a* and the coil conductor 31*a* are electrically connected to each other via the first coupling conductor 40*a*.

The plurality of insulating layers 15*e* each with the via conductor 34*e* are laminated so as to overlap the insulating layer 15*d* with the coil conductor 31*d* and the via conductor 34*d* positioned at the other end side of the coil 30. This makes the via conductors 34*e* electrically connected to one another to configure the second coupling conductor 40*b*, and the second coupling conductor 40*b* is exposed from the second end face 11*b* of the multilayer body 10. As a result, the second outer electrode 20*b* and the coil conductor 31*d* are electrically connected to each other via the second coupling conductor 40*b*.

When a land portion is connected to each of the via conductor 34*e* configuring the first coupling conductor 40*a* and the via conductor 34*e* configuring the second coupling conductor 40*b*, the shape of the first coupling conductor 40*a* and the second coupling conductor 40*b* indicates a shape except the land portion.

The coil 30 has preferably 35 turns or more, more preferably 35 turns or more and 45 turns or less (i.e., from 35 turns to 45 turns). When the coil 30 has 35 turns or more, the impedance of the coil 30 is increased, and a transmission coefficient S21 in a high frequency band is also increased. Thus, the high frequency characteristics of the multilayer coil component 1 are improved.

Preferable lengths of the coil conductor 31, the first coupling conductor 40*a*, and the second coupling conductor 40*b* are described below.

When viewed from the length direction L, the inner diameter of the coil conductor 31 is preferably approximately 15% or more of the length $W_2$ of the multilayer body 10 in the width direction W and approximately 40% or less thereof (i.e., from approximately 15% of the length $W_2$ of the multilayer body 10 in the width direction W to approximately 40% thereof). The inner diameter of the coil conductor 31 is synonymous with the coil diameter of the coil 30. When the coil 30 has a substantially polygonal shape viewed from the length direction L, the diameter of a circle corresponding to the area of the substantially polygonal shape is taken as the coil diameter of the coil 30, that is, the inner diameter of the coil conductor 31.

The length of the first coupling conductor 40*a* and the second coupling conductor 40*b* in the length direction L is preferably approximately 2.5% or more of the length $L_2$ of the multilayer body 10 in the length direction L and approximately 7.5% thereof (i.e., from approximately 2.5% of the length $L_2$ of the multilayer body 10 in the length direction L to approximately 7.5% thereof), more preferably approximately 2.5% or more thereof, more preferably approximately 2.5% or more thereof and approximately 5.0% or less thereof (i.e., from approximately 2.5% to approximately 5.0% thereof). This decreases the inductance of the first coupling conductor 40*a* and the second coupling conductor 40*b*, thereby improving the high frequency characteristics of the multilayer coil component 1.

The length of the first coupling conductor 40*a* and the second coupling conductor 40*b* in the width direction W is preferably approximately 8.0% or more of the length $W_2$ of the multilayer body 10 in the width direction W and approximately 20% or less thereof (i.e., from approximately 8.0% of the length $W_2$ of the multilayer body 10 in the width direction W to approximately 20% thereof).

Specific examples of the preferable lengths of the coil conductor 31, the first coupling conductor 40*a*, and the second coupling conductor 40*b* are described below.

(1) When the Multilayer Coil Component 1 is of the 0603 Size

When viewed from the length direction L, the inner diameter of the coil conductor 31 is preferably approximately 50 μm or more and approximately 100 μm or less (i.e., from approximately 50 μm to approximately 100 μm).

The length of the first coupling conductor 40*a* and the second coupling conductor 40*b* in the length direction L is preferably approximately 15 μm or more and approximately 45 μm or less (i.e., from approximately 15 μm to approximately 45 μm), more preferably approximately 15 μm or more and approximately 30 μm or less (i.e., from approximately 15 μm to approximately 30 μm).

The length of the first coupling conductor 40*a* and the second coupling conductor 40*b* in the width direction W is preferably approximately 30 μm or more and approximately 60 μm or less (i.e., from approximately 30 μm to approximately 60 μm).

(2) When the Multilayer Coil Component 1 is of the 0402 Size

When viewed from the length direction L, the inner diameter of the coil conductor 31 is preferably approximately 30 μm or more and approximately 70 μm or less (i.e., from approximately 30 μm to approximately 70 μm).

The length of the first coupling conductor 40*a* and the second coupling conductor 40*b* in the length direction L is preferably approximately 10 μm or more and approximately 30 μm or less (i.e., from approximately 10 μm to approximately 30 μm), more preferably approximately 10 μm or more and approximately 25 μm or less (i.e., from approximately 10 μm to approximately 25 μm).

The length of the first coupling conductor 40*a* and the second coupling conductor 40*b* in the width direction W is preferably approximately 20 μm or more and approximately 40 μm or less (i.e., from approximately 20 μm to approximately 40 μm).

(3) When the Multilayer Coil Component 1 is of the 1005 Size

When viewed from the length direction L, the inner diameter of the coil conductor 31 is preferably approximately 80 μm or more and approximately 170 μm or less (i.e., from approximately 80 μm to approximately 170 μm).

The length of the first coupling conductor 40*a* and the second coupling conductor 40*b* in the length direction L is preferably approximately 25 μm or more and approximately 75 μm or less (i.e., from approximately 25 μm to approximately 75 μm), more preferably approximately 25 μm or more and approximately 50 μm or less (i.e., from approximately 25 μm to approximately 50 μm).

The length of the first coupling conductor 40*a* and the second coupling conductor 40*b* in the width direction W is preferably approximately 40 μm or more and approximately 100 μm or less (i.e., from approximately 40 μm to approximately 100 μm).

Multilayer Coil Component Manufacturing Method

The multilayer coil component of the present disclosure is manufactured, for example, by using the following method.

Fabrication of Ferrite Material

First, iron oxide ($Fe_2O_3$), zinc oxide (ZnO), copper oxide (CuO), and nickel oxide (NiO) which are oxide materials are weighed so as to each have a predetermined ratio. Each oxide material may contain unavoidable impurities. Next, these oxide materials are wet-mixed, and then ground. Here, an additive may be added, such as manganese oxide ($Mn_3O_4$), cobalt oxide ($Co_3O_4$), tin oxide ($SnO_2$), bismuth oxide ($Bi_2O_3$), or silicon oxide ($SiO_2$). Then, the obtained ground product is dried and then preliminarily fired. The temperature for preliminary firing is assumed to be approximately 700° C. or more and approximately 800° C. or less (i.e., from approximately 700° C. to approximately 800° C.), for example. With this, a powdered ferrite material is fabricated.

From a viewpoint of enhancing the inductance of a multilayer coil component obtained later, the composition of the ferrite material is preferably as follows: iron oxide ($Fe_2O_3$) is approximately 40 mol % or more and approximately 49.5 mol % or less (i.e., from approximately 40 mol % to approximately 49.5 mol %); zinc oxide (ZnO) is approximately 5 mol % or more and approximately 35 mol % or less (i.e., from approximately 5 mol % to approximately 35 mol %); copper oxide (CuO) is approximately 6 mol % or more and approximately 12 mol % or less (i.e., from approximately 6 mol % to approximately 12 mol %); and nickel oxide (NiO) is approximately 8 mol % or more and approximately 40 mol % or less (i.e., from approximately 8 mol % to approximately 40 mol %).

Fabrication of Ceramic Green Sheet

First, the ferrite material, an organic binder such as polyvinyl butyral-based resin, an organic solvent such as ethanol or toluene, and so forth are mixed and then ground to fabricate ceramic slurry. Then, the ceramic slurry is formed into a sheet shape having a predetermined thickness by a doctor blade scheme or the like and then punched into a predetermined size, thereby fabricating a ceramic green sheet.

When the ferrite material is used as a material for the ceramic green sheet, the magnetic flux less tends to be leaked outside the multilayer body obtained later. As a material for the ceramic green sheet, in place of a magnetic material such as a ferrite material, for example, a non-magnetic material such as a glass ceramic material, a mixed material of a magnetic material and a non-magnetic material, or the like may be used.

Formation of Conductive Patterns

By applying laser to a predetermined location of the ceramic green sheet, via holes are formed. Then, by screen printing or the like, the via holes are filled with conductive paste such as silver paste, and the main surface of the ceramic green sheet is coated with the conductive paste. With this, a conductive pattern for via conductors is formed in the via holes on the ceramic green sheet, and a conductive pattern for coil conductors connected to the conductive pattern for via conductors is formed on the main surface. Then, the ceramic green sheet is dried, thereby fabricating a coil sheet with the conductive pattern for coil conductors and the conductive pattern for via conductors formed on the ceramic green sheet. A plurality of that coil sheets are fabricated. For each coil sheet, for example, a conductive pattern corresponding to the coil conductors depicted in FIG. 10 and FIG. 11 is formed as a conductive pattern for coil conductors. Furthermore, for each coil sheet, for example, a conductive pattern corresponding to the via conductors depicted in FIG. 10 and FIG. 11 is formed as a conductive pattern for via conductors. More specifically, with reference to FIG. 10 and FIG. 11, a plurality of coil sheets each with a conductive pattern corresponding to the coil conductor 31*a* and the via conductor 34*a* formed thereon, a plurality of coil sheets each with a conductive pattern corresponding to the coil conductor 31*b* and the via conductor 34*b* formed thereon, a plurality of coil sheets each with a conductive pattern corresponding to the coil conductor 31*c* and the via conductor 34*c* formed thereon, and a plurality of coil sheets each with a conductive pattern corresponding to the coil conductor 31*d* and the via conductor 34*d* formed thereon are fabricated.

Also, separately from the coil sheets, a via sheet with a conductive pattern for via conductors formed on the ceramic green sheet is fabricated. A plurality of that via sheets are fabricated. For each via sheet, for example, a conductive pattern corresponding to the via conductors depicted in FIG. 10 and FIG. 11 is formed as a conductive pattern for via conductors. More specifically, with reference to FIG. 10 and FIG. 11, a plurality of via sheets each with a conductive pattern corresponding to the via conductor 34*e* formed thereon are fabricated.

Fabrication of Multilayer Body Block

The coil sheets and the via sheets are laminated in a predetermined order and are then subjected to thermocompression bonding, thereby fabricating a multilayer body block.

Fabrication of Multilayer Body and Coil

By cutting the multilayer body block into a predetermined size by a dicer or the like, individual chips are fabricated. For the individual chips, their corner portions and ridge portions may be rounded by, for example, barrel polishing. Then, the individual chips are fired. Here, the ceramic green sheets of the coil sheets and the via sheets become insulating layers after firing to configure a multilayer body. Also, the conductive pattern for coil conductors and the conductive pattern for via conductors of the coil sheets respectively become a coil conductor and a via conductor after firing to configure a coil. With these, the multilayer body with the plurality of insulating layers laminated in the laminating direction, here, in the length direction, and the coil provided inside the multilayer body are fabricated. Here, the coil is formed with the plurality of coil conductors laminated and electrically connected via the via conductors in the length direction. Also, the laminating direction of the insulating layers and the direction of the coil axis of the coil are parallel to the first main surface of the multilayer body as the mount surface, here, parallel along the length direction.

The conductive pattern for via conductors of the via sheet becomes a via conductor after firing to configure the first coupling conductor and the second coupling conductor. The first coupling conductor is exposed from the first end face of the multilayer body. The second coupling conductor is exposed from the second end face of the multilayer body.

In the process of fabricating the multilayer body and the coil, in the state before firing, by adjusting the length of the ceramic green sheet in the length direction, the length of the conductive pattern for coil conductors in the length direction, the line width of the conductive pattern for coil conductors when viewed from the length direction, and so forth, the length of the coil in the length direction is set to be approximately 85% or more of the length of the multilayer body in the length direction and approximately 94% or less thereof (i.e., from approximately 85% of the length of the multilayer body in the length direction to approximately 94% thereof). Furthermore, when the line width of each coil conductor viewed from the length direction is taken as s (unit: μm), the length of the coil conductor in the length direction is taken as a (unit: μm), and a distance between the coil conductors adjacent to each other in the length direction is taken as b (unit: μm), coordinates (X, Y) where X=s and Y=a/(a+b) are set to be present in a region formed by a straight line sequentially connecting the point A (40, 0.7), the point B (50, 0.6), the point C (60, 0.6), the point D (70, 0.5), the point E (80, 0.5), the point F (80, 0.8), the point G (50, 0.8), and the point H (40, 0.9).

Formation of Outer Electrodes

The multilayer body is diagonally immersed into a layer formed by extending conductive paste such as silver paste to a predetermined thickness. Then, the obtained film is burned to form an underlying electrode layer on the surface of the multilayer body. More specifically, an underlying electrode layer is formed, the underlying electrode layer spreading from part of the first end face of the multilayer body over part of the first side surface, part of the second side surface, and part of the first main surface. Also, an underlying electrode layer is formed, the underlying electrode layer spreading from part of the second end face of the multilayer body over part of the first side surface, part of the second side surface, and part of the first main surface. Then, by electrolytic plating or the like, a nickel-plated film and a tin-plated film are sequentially formed on each underlying electrode layer. With these, a first outer electrode electrically connected to the coil via the first coupling conductor and a second outer electrode electrically connected to the coil via the second coupling conductor are formed.

With the above, the multilayer coil component of the present disclosure is manufactured.

EXAMPLES

In the following, examples more specifically disclosing the multilayer coil component of the present disclosure are described. However, the present disclosure is not limited to these examples.

A multilayer coil component sample was manufactured by using the following method.

Fabrication of Ferrite Material

First, oxide materials were weighed so as to have a ratio of iron oxide ($Fe_2O_3$) being 49.0 mol %, zinc oxide (ZnO) being 22.0 mol %, copper oxide (CuO) being 8.0 mol %, and nickel oxide (NiO) being 21.0 mol %. Next, these oxide materials, pure water, and a dispersant were put into a ball mill with PSZ media and mixed, and then ground. Then, the obtained ground product was dried and then preliminarily fired at 800° C. for two hours. With this, a powdered ferrite material was fabricated.

Fabrication of Ceramic Green Sheet

First, the ferrite material, an organic binder such as polyvinyl butyral-based resin, and an organic solvent such as ethanol or toluene were put into the ball mill with PSZ media and mixed, and then ground to fabricate ceramic slurry. Then, the ceramic slurry was formed into a sheet shape having a predetermined thickness by a doctor blade scheme and then punched into a predetermined size, thereby fabricating a ceramic green sheet.

Formation of Conductive Patterns

By applying laser to a predetermined location of the ceramic green sheet, via holes were formed. Then, by screen printing, the via holes were filled with silver paste, and the main surface of the ceramic green sheet was coated with the silver paste. With this, a conductive pattern for via conductors was formed in the via holes on the ceramic green sheet, and a conductive pattern for coil conductors connected to the conductive pattern for via conductors was formed on the main surface. Then, the ceramic green sheet was dried, thereby fabricating a coil sheet with the conductive pattern for coil conductors and the conductive pattern for via conductors formed on the ceramic green sheet. Fifty-six coil sheets were fabricated. For each coil sheet, a conductive pattern corresponding to the coil conductors depicted in FIG. 10 and FIG. 11 was formed as a conductive pattern for coil conductors. Furthermore, for each coil sheet, a conductive pattern corresponding to the via conductors depicted in FIG. 10 and FIG. 11 was formed as a conductive pattern for via conductors.

Also, separately from the coil sheets, a via sheet with a conductive pattern for via conductors formed on the ceramic green sheet was fabricated. A predetermined number of that via sheets were fabricated. For each via sheet, a conductive pattern corresponding to the via conductors depicted in FIG. 10 and FIG. 11 was formed as a conductive pattern for via conductors.

Fabrication of Multilayer Body Block

The coil sheets and the via sheets were laminated in the order depicted in FIG. 10 and FIG. 11 and were then subjected to thermocompression bonding, thereby fabricating a multilayer body block.

Fabrication of Multilayer Body and Coil

By cutting the multilayer body block into a predetermined size by a dicer, individual chips were fabricated. For the individual chips, their corner portions and ridge portions were rounded by barrel polishing. Then, the individual chips were fired at 900° C. for two hours. Here, the ceramic green sheets of the coil sheets and the via sheets became insulating layers after firing to configure a multilayer body. Also, the conductive pattern for coil conductors and the conductive pattern for via conductors of the coil sheets respectively became a coil conductor and a via conductor after firing to configure a coil. With these, the multilayer body with a predetermined number of insulating layers laminated in the laminating direction, here, in the length direction, and the coil provided inside the multilayer body were fabricated as depicted in FIG. 7. Here, the coil was formed with 56 coil conductors having a length of ¾ turns of the coil laminated and electrically connected via the via conductors in the length direction, and had 42 turns. Also, the laminating direction of the insulating layers and the direction of the coil axis of the coil were parallel to the first main surface of the multilayer body as the mount surface, here, parallel along the length direction.

The conductive pattern for via conductors of the via sheet became a via conductor after firing to configure the first coupling conductor and the second coupling conductor. The first coupling conductor was exposed from the first end face of the multilayer body. The second coupling conductor was exposed from the second end face of the multilayer body.

In the process of fabricating the multilayer body and the coil, in the state before firing, by adjusting the length of the ceramic green sheet in the length direction, the length of the conductive pattern for coil conductors in the length direction, the line width of the conductive pattern for coil conductors when viewed from the length direction, and so forth, ten specifications were set as follows: $a/(a+b)$ is 0.1, 0.2, 0.3, 0.4, 0.5, 0.6, 0.7, 0.8, 0.9, and 0.95 when the line width of each coil conductor viewed from the length direction is taken as s (unit: μm), the length of the coil conductor in the length direction is taken as a (unit: μm), and a distance between the coil conductors adjacent to each other in the length direction is taken as b (unit: μm). Furthermore, for each of the above-described ten specifications, five specifications were set as follows: the line width s of the coil conductor is 40 μm, 50 μm, 60 μm, 70 μm, and 80 μm. That is, coils in a total of fifty specifications were fabricated.

Formation of Outer Electrodes

The multilayer body was diagonally immersed into a layer formed by extending silver paste to a predetermined thickness. Then, the obtained film was burned at 800° C. for approximately one minute to form an underlying electrode layer on the surface of the multilayer body. More specifically, an underlying electrode layer was formed, the underlying electrode layer spreading from part of the first end face of the multilayer body over part of the first side surface, part of the second side surface, and part of the first main surface. Also, an underlying electrode layer was formed, the underlying electrode layer spreading from part of the second end face of the multilayer body over part of the first side surface, part of the second side surface, and part of the first main surface. Then, by electrolytic plating, a nickel-plated film and a tin-plated film were sequentially formed on each underlying electrode layer. With these, a first outer electrode electrically connected to the coil via the first coupling conductor and a second outer electrode electrically connected to the coil via the second coupling conductor were formed.

With the above, multilayer coil component samples for fifty specifications were manufactured.

Evaluation 1

The periphery of each multilayer coil component sample was sealed with resin, and an LT surface along the length direction and the height direction was exposed from resin. Next, for each multilayer coil component sample, the LT surface was polished to a substantially center portion in the width direction. Then, to remove lumps due to polishing, ion milling was performed on the polish surface. Then, the polish surface was photographed by a scanning electron microscope (SEM), and the length of the coil in the length direction was measured from that photograph. As a result, the length was in a range of 0.513 mm or more and 0.524 mm or less (i.e., from 0.513 mm to 0.524 mm), which is a range of 90% or more of the length of the multilayer body in the length direction and 92% or less thereof (i.e., from 90% of the length of the multilayer body in the length direction to 92% thereof).

Evaluation 2

Figure 12:
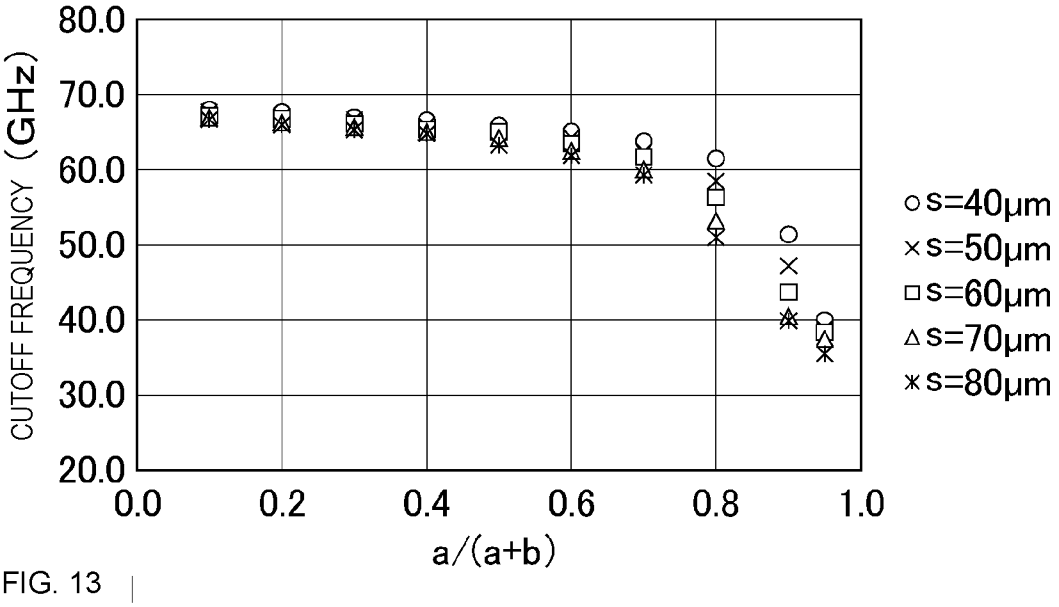
FIG. 12 is a graph depicting a relation between a/(a+b) and cutoff frequency for each multilayer coil component sample.

For each multilayer coil component sample, the transmission coefficient S21 that can be found from a ratio of electric power of a transmission signal with respect to an input signal was measured by a network analyzer, as the frequency was changed. Then, by taking a resonant frequency with the transmission coefficient S21 becoming −1.5 dB taken as cutoff frequency, a relation between a/(a+b) and cutoff frequency was plotted on a graph. FIG. 12 is a graph depicting a relation between a/(a+b) and cutoff frequency for each multilayer coil component sample.

Figure 13:
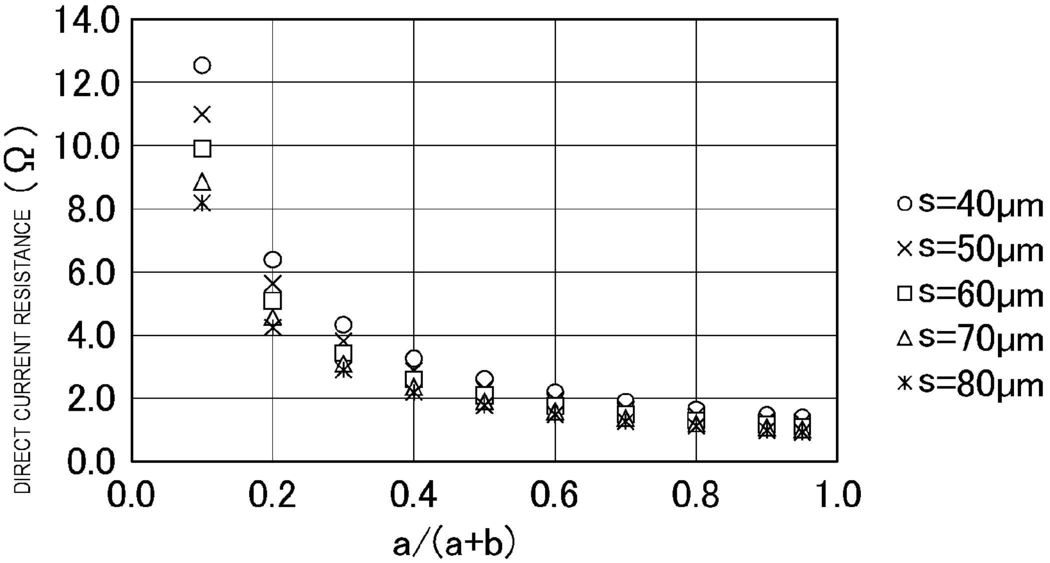
FIG. 13 is a graph depicting a relation between a/(a+b) and direct current resistance for each multilayer coil component sample.

Also, for each multilayer coil component sample, a direct current resistance was measured. Then, a relation between a/(a+b) and direct current resistance was plotted on a graph. FIG. 13 is a graph depicting a relation between a/(a+b) and direct current resistance for each multilayer coil component sample.

From FIG. 12 and FIG. 13, it was found that the cutoff frequency is 50 GHz or more and the direct current resistance is 2Ω or less when the specification of the coil conductor is in the range depicted in FIG. 8. More specifically, when the coordinates (X, Y) where X=s and Y=a/(a+b) are present in a region formed by a straight line sequentially connecting the point A (40, 0.7), the point B (50, 0.6), the point C (60, 0.6), the point D (70, 0.5), the point E (80, 0.5), the point F (80, 0.8), the point G (50, 0.8), and the point H (40, 0.9) as depicted in FIG. 8, it was found that the cutoff frequency is 50 GHz or more and the direct current resistance is 2Ω or less. That is, it was found that the multilayer coil component with the specification of the coil conductor being in the range depicted in FIG. 8 is excellent in high frequency characteristics and has a low direct current resistance.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

a multilayer body including a plurality of insulating layers laminated in a laminating direction, the multilayer body having a first end face and a second end face facing each other in a length direction, a first main surface and a second main surface facing each other in a height direction orthogonal to the length direction, and a first side surface and a second side surface facing each other in a width direction orthogonal to the length direction and the height direction;

a coil provided inside the multilayer body and configured with a plurality of coil conductors laminated and electrically connected in the length direction, the laminating direction of the insulating layers and a direction of a coil axis of the coil being parallel to the first main surface of the multilayer body as a mount surface, and the coil having a length in the length direction from 85% of a length of the multilayer body in the length direction to 94% thereof; and a first outer electrode and a second outer electrode provided on a surface of the multilayer body and electrically connected to the coil, the first outer electrode spreading from part of the first end face over part of the first main surface of the multilayer body, and the second outer electrode spreading from part of the second end face over part of the first main surface of the multilayer body, wherein when a line width of each of the coil conductors viewed from the length direction is taken as s (unit: μm), a length of the coil conductor in the length direction is taken as a (unit: μm), and a distance between the coil conductors adjacent to each other in the length direction is taken as b (unit: μm), coordinates (X, Y) where X=s and Y=a/(a+b) are present in a region formed by a straight line sequentially connecting a point A (40, 0.7), a point B (50, 0.6), a point C (60, 0.6), a point D (70, 0.5), a point E (80, 0.5), a point F (80, 0.8), a point G (50, 0.8), and a point H (40, 0.9).

2. The multilayer coil component according to claim 1, wherein the coordinates (X, Y) are present in a region defined by a straight line sequentially connecting a point I (40, 0.8), a point J (50, 0.7), a point K (60, 0.7), a point L (70, 0.6), a point M (80, 0.6), the point F (80, 0.8), the point G (50, 0.8), and the point H (40, 0.9).

3. The multilayer coil component according to claim 1, wherein the coil has 35 turns or more.

4. The multilayer coil component according to claim 1, further comprising:

a first coupling conductor and a second coupling conductor provided to the multilayer body, wherein the first coupling conductor connects the first outer electrode and the coil, and the second coupling conductor connects the second outer electrode and the coil.

5. The multilayer coil component according to claim 4, wherein the first coupling conductor connects the first outer electrode and the coil in a linear manner, and the second coupling conductor connects the second outer electrode and the coil in a linear manner.

6. The multilayer coil component according to claim 2, wherein the coil has 35 turns or more.

7. The multilayer coil component according to claim 2, further comprising:

a first coupling conductor and a second coupling conductor provided to the multilayer body, wherein the first coupling conductor connects the first outer electrode and the coil, and the second coupling conductor connects the second outer electrode and the coil.

8. The multilayer coil component according to claim 3, further comprising:

a first coupling conductor and a second coupling conductor provided to the multilayer body, wherein the first coupling conductor connects the first outer electrode and the coil, and the second coupling conductor connects the second outer electrode and the coil.

9. The multilayer coil component according to claim 6, further comprising:

a first coupling conductor and a second coupling conductor provided to the multilayer body, wherein the first coupling conductor connects the first outer electrode and the coil, and the second coupling conductor connects the second outer electrode and the coil.

10. The multilayer coil component according to claim 7, wherein the first coupling conductor connects the first outer electrode and the coil in a linear manner, and the second coupling conductor connects the second outer electrode and the coil in a linear manner.

11. The multilayer coil component according to claim 8, wherein the first coupling conductor connects the first outer electrode and the coil in a linear manner, and the second coupling conductor connects the second outer electrode and the coil in a linear manner.

12. The multilayer coil component according to claim 9, wherein the first coupling conductor connects the first outer electrode and the coil in a linear manner, and the second coupling conductor connects the second outer electrode and the coil in a linear manner.

* * * * *